United States Patent
Loveland et al.

(10) Patent No.: US 8,698,646 B2
(45) Date of Patent: Apr. 15, 2014

(54) SYSTEMS AND APPARATUS FOR LIGHT-BASED SOCIAL COMMUNICATIONS

(75) Inventors: Damien Gerard Loveland, Richmond (CA); Aloysius Cornelis Arnoldus Maria Ketelaars, Breda (NL); Lucas Leo Desiree Van Der Poel, Waalre (NL); Anthonie Hendrik Bergman, Nuenen (NL); Winfried Antonius Henricus Berkvens, Sint-Oedenrode (NL); Allan Brent York, Langley (CA)

(73) Assignee: Koninklijke Philips N.V., Eindhoven (NL)

( * ) Notice: Subject to any disclaimer, the term of this patent is extended or adjusted under 35 U.S.C. 154(b) by 187 days.

(21) Appl. No.: 13/264,164

(22) PCT Filed: Apr. 1, 2010

(86) PCT No.: PCT/IB2010/051445
§ 371 (c)(1),
(2), (4) Date: Oct. 13, 2011

(87) PCT Pub. No.: WO2010/122440
PCT Pub. Date: Oct. 28, 2010

(65) Prior Publication Data
US 2012/0034934 A1  Feb. 9, 2012

Related U.S. Application Data

(60) Provisional application No. 61/171,543, filed on Apr. 22, 2009.

(51) Int. Cl.
*G08B 5/00* (2006.01)
*G06F 3/033* (2013.01)
*G09G 5/08* (2006.01)
*B60R 1/12* (2006.01)
*H05B 37/02* (2006.01)

(52) U.S. Cl.
CPC ............... *B60R 1/12* (2013.01); *H05B 37/029* (2013.01)
USPC ....................................... 340/815.4; 345/163

(58) Field of Classification Search
CPC ............................... B60R 1/12; H05B 37/029
USPC ........ 340/815.4; 315/291, 292, 312; 345/156, 345/163; 715/751
See application file for complete search history.

(56) References Cited

U.S. PATENT DOCUMENTS

| | | | |
|---|---|---|---|
| 6,016,038 A | 1/2000 | Mueller et al. | |
| 6,211,626 B1 | 4/2001 | Lys et al. | |
| 6,282,206 B1 * | 8/2001 | Hindus et al. | 370/468 |
| 8,407,750 B2 * | 3/2013 | Vorbau | 725/109 |
| 2007/0300174 A1 | 12/2007 | Macbeth et al. | |
| 2008/0197782 A1 | 8/2008 | Frumau | |
| 2008/0295072 A1 | 11/2008 | Eves et al. | |
| 2011/0193779 A1 * | 8/2011 | Williams | 345/163 |
| 2012/0266081 A1 * | 10/2012 | Kao | 715/751 |

FOREIGN PATENT DOCUMENTS

WO  0022860 A1  4/2000

\* cited by examiner

*Primary Examiner* — John A Tweel, Jr.
(74) *Attorney, Agent, or Firm* — Mark L. Beloborodov

(57) ABSTRACT

Light-based systems for communicating information associated with the formation of social connections are disclosed. One or more lighting controllers controlling individually controllable luminaires are used in conjunction with communication networks in order to identify and form remote light-based social connections. Additionally, visualization controllers are used in conjunction with visualization infrastructures, visualization actuators, localization systems and identification systems to visually identify proximally present potential social connections.

37 Claims, 8 Drawing Sheets

SYSTEMS AND APPARATUS FOR LIGHT-BASED SOCIAL COMMUNICATIONS

TECHNICAL FIELD

The present invention is directed generally to light-based systems and apparatus for social communications. More particularly, the present invention is directed to light-based systems for communicating information associated with the formation of social connections.

BACKGROUND

Digital lighting technologies, i.e. illumination based on semiconductor light sources, such as light-emitting diodes (LEDs), today offer a viable alternative to traditional fluorescent, HID, and incandescent lamps. Recent advances in LED technology coupled with its many functional advantages such as high energy conversion and optical efficiency, durability, and lower operating costs, has led to the development of efficient and robust full-spectrum lighting sources that enable a variety of lighting effects. For example, fixtures embodying these lighting sources may include one or more LEDs capable of producing different colors, e.g. red, green, and blue, as well as a processor for independently controlling the output of the LEDs in order to generate a variety of colors and color-changing lighting effects, as discussed in U.S. Pat. Nos. 6,016,038 and 6,211,626, incorporated herein by reference.

Additionally, new developments in digital technologies have made the precise lighting control a reality. Consequently, light-based systems are used today to visually communicate information to individuals. For example, patrons waiting to be seated at a dining establishment are often provided with pagers that visually indicate when the staff is ready to seat them.

While advances in digital lighting technologies have given rise to precisely controllable lighting, the tremendous and ever increasing popularity of the Internet as a communication medium has led to the creation of a host of social networking websites designed to meet the needs of individuals looking to form social relationships. Despite providing numerous benefits to individuals interested in forming remote social connections, such web-based social networking technologies lack the ability to seamlessly integrate into existing establishments, such as bars and clubs, which are designed to facilitate the formation of social connections between individuals physically present in the same location. Such social networking technologies fail to seamlessly integrate into existing social environments because, among other reasons, they often require their users to pay a degree of attention to the formation of remote social connections that renders the users unable to simultaneously engage in meaningful social interactions with individuals physically present around them. Consequently, individuals wishing to form social connections are left to choose between visiting social establishments such as bars or clubs on the one hand, and using one or more existing social networking technologies on the other hand.

As a result, there is a dearth of technological solutions that allow individuals to both engage in meaningful social interactions with others in their physical presence and simultaneously form remote social connections. This is partly because current solutions designed to help individuals form social connections do not simultaneously leverage advances made in other areas of technology, such as controllable solid-state lighting and communication networks. Therefore, there exists a need in the art to combine advances made in the realm of controllable solid state lighting with advances made in the realm of networked communications.

Along with advances made in the realm of networked communications, developments in the area of wireless communications, and, more particularly, broadband wireless communications, have made the wireless exchange of content-rich data, such as video data, a reality. Wireless broadband communications technologies, when used in combination with personal mobile electronic communication devices such as cellular phones or personal digital assistants, provide individuals today with the ability to almost instantaneously and dynamically share information about themselves.

Despite the availability of such technologies, there currently exists no adequate solution to problems involving the identification, under time constrains, of short-term social connections in public spaces, in order that identified individuals may thereafter engage in social activities of mutual interest. For example, individuals who are traveling alone on business may crave the company of other individuals with similar interests with whom to participate in social activities such as visiting a museum or playing a round of golf. However, given that (i) such individuals may have only a few hours of recreational time, and (ii) such individuals may be unable to schedule the recreational time far in advance, currently available social networking technologies, which are often designed without taking such time constraints into account, do not offer viable solutions under such circumstances.

Moreover, although useful in finding longer-term companions, conventional social connection technologies are poorly suited to help individuals quickly identify and contact others who are (i) in the same vicinity, and are (ii) presently available (or available within a relatively short duration) to engage in one or more social activities of mutual interest. Additionally, as currently available social networking technologies do not leverage the power of controllable solid-state lighting, such technologies are incapable of visually identifying for an individual, potential social contacts present in the individual's physical environment. Hence, such technologies are unlikely to be effective in the often crowded public spaces, such as hotel lobbies and train stations, where they are likely to be needed. There is consequently a dearth of technological solutions enabling individuals in public spaces to instantaneously identify and communicate with proximally present individuals who share similar interests.

SUMMARY

Applicants herein have recognized and appreciated that there is a substantial need in the art to combine advances made in the realm of controllable solid-state lighting with advances made in the realm of networked communications. Specifically, Applicants recognized that current technological solutions do not allow an individual to both engage in meaningful social interactions with persons in his/her physical environment as well as engage simultaneously in the formation of remote social connections, and that combining advances made in the realm of controllable solid-state lighting with advances made in the realm of communication networks has the capacity to provide particularly advantageous solutions under certain circumstances. These circumstances include situations involving individuals wishing to engage in the formation of remote social connections while also interacting with individuals more proximally present. Consequently, the present invention is directed at the formation of light-based social communication systems and apparatus that allow users to communicate with potential remote social contacts, while also leaving such users free to simultaneously socialize with individuals more proximally present.

Applicants further recognized and appreciated that there is a real need in the art to leverage advances made in the realm of controllable solid-state lighting with advances made in the realm of wireless broadband communications. In that regard, Applicants recognized that the ability to visually identify individuals is crucial under certain circumstances. Such circumstances include situations where individuals wish to readily identify, in often crowded public spaces, potential short-term social connections who are presently available to engage in activities of mutual interest. Applicants also found that visually identifying any potential social contact has the added benefit of making available useful information such as a potential social contact's body language. Such information could prove highly relevant when making the ultimate decision regarding whether or not to initiate social contact. Consequently, the present disclosure is also directed at light-based systems and apparatus for forming social connections between proximally located individuals interested in engaging in social activities of mutual interest.

Many embodiments of the present invention involve the use of controllable solid state lighting in the identification and formation of social connections between individuals. For example, in many embodiments, a lighting controller may transmit a light setting capturing the ambient lighting in a particular region of an establishment, such as a bar. This light setting may then be electronically matched to one or more ambient light settings at remote locations, such as seating areas in different establishments or different seating areas within the same establishment. A communication network may then be used to transmit a signal to individuals at these remote locations. Such a signal may communicate the potential for a light-based social connection by directing individually controllable luminaires to temporarily alter the ambient lighting at the matched remote locations. Once individuals at the matched remote locations are notified of the potential for a light-based social communication, such individuals may choose to communicate a desire to form a light-based social connection by, for example, temporarily altering their ambient light settings.

As some embodiments of the invention use ambient light settings to identify potential remote social connections, individuals utilizing such embodiments to form remote social connections remain free to simultaneously engage in social interactions with others in their physical environment. Therefore, unlike currently existing systems that enable the formation of remote social connections, light-based systems according to various embodiments of the invention allow individuals to both interact with potential social connections in their physical surroundings and at once engage in the formation of remote social connections.

Generally, according to various embodiments of the invention, a light-based system for forming social connections includes a first lighting controller, a first memory, a processor, a communication network, a second lighting controller and a second memory. The first lighting controller controls a plurality of individually controllable luminaires in a lighting network and transmits a first signal indicative of a first location identifier and a second signal indicative of a first localized light setting associated with the first location identifier. The processor receives the second signal from the first lighting controller and determines the first localized light setting. In many embodiments, the processor subsequently receives from the first memory at least one second location identifier associated with a second localized light setting where a correlation exists between the second localized light setting and the first localized light setting. The communication network receives from the processor, the at least one second location identifier received from the first memory, and transmits a third signal indicative of a potential for a light-based connection. According to some embodiments, the third signal indicative of a potential for a light-based connection may comprise a signal indicative of an increase in the brightness associated with the second localized light setting. In many embodiments, the second lighting controller is a lighting controller that controls individually controllable luminaires proximate to the at least one second location identifier received from the first memory. The second lighting controller receives the third signal from the communication network and may transmit, in response, a fourth signal indicative of an interest in establishing a light-based connection. The processor may subsequently receive the fourth signal sent from the second lighting controller and create an association between the first location identifier and the second location identifier in the second memory. In some embodiments, the fourth signal indicative of an interest in establishing a light-based connection comprises a signal indicating an increase in a brightness associated with the first localized light setting. Additionally, according to some embodiments, the fourth signal and the third signal must be temporally separated by at most a predetermined interval in order for the fourth signal to be considered responsive to the third signal and indicative of an interest in establishing a light-based connection.

In some aspects of the invention, receiving from the first memory the at least one second location identifier associated with the second localized light setting involves the processor first locating the at least one second location identifier in the first memory and subsequently checking a second memory for the existence of the at least one second location identifier. If the processor finds the at least one second location identifier in the second memory, the processor, according to some aspects of the invention, may discard the at least one second location identifier already identified, and return to querying the first memory for at least another second location identifier associated with a second localized light setting having a correlation with the first localized light setting.

In some other aspects of the invention, the correlation between the first localized light setting and the second localized light setting may be based on a difference between a chromaticity associated with the first localized light setting and a chromaticity associated with the second localized light setting. The correlation may also be based on a difference between a brightness associated with the first localized light setting and a brightness associated with the second localized light setting.

According to some embodiments of the invention, a light-based system for forming social connections comprises a lighting controller, a first memory, a processor, a communication network, and a second memory. The lighting controller may control a plurality of individually controllable luminaires in a lighting network and transmit a first signal indicative of a first location identifier and a second signal indicative of a first localized light setting. The processor may determine the first localized light setting from the second signal transmitted by the lighting controller, and receive, from the first memory, at least one second location identifier associated with a second localized light setting having a correlation with the first localized light setting. The communication network may subsequently receive the at least one second location identifier from the processor and transmit a third signal indicative of a potential for a light-based connection. In some embodiments, the lighting controller may receive the third signal from the communication network and may transmit, in response, a fourth signal indicative of an interest in establishing a light-based connection. The processor may also receive the fourth signal from the lighting controller, and create an association in the second memory between the first location identifier and the at least one second location identifier.

According to many embodiments of the invention, a light-based system for forming social connections comprises a localization system, an identification system, a memory, a visualization controller, a visualization infrastructure, and one or more visualization actuators. The localization system may determine a location and orientation associated with a user of the system, and then transmit a first signal indicative of the location and the orientation of the user. The identification system may determine a user identifier associated with the user and transmit a second signal indicative of the user identifier. The visualization controller may receive the first and second signals, retrieve from the memory one or more user data associated with the user identifier, and generate an aura-creation command based on a combination including the user data, the location of the user, and the orientation of the user. The visualization controller may additionally transmit the aura-creation command to a visualization infrastructure. Subsequently, the visualization infrastructure may control the one or more visualization actuators proximate to the user in order to display an aura comprising at least the one or more user data associated with the user.

According to other embodiments of the invention, the visualization controller may receive the first and second signals, retrieve from the memory one or more user data associated with the user identifier, and generate an aura-creation command based on a combination including the user data. The visualization controller may additionally transmit the aura-creation command to a visualization infrastructure. Subsequently, the visualization infrastructure may control the one or more visualization actuators proximate to a second user, where the second user is different from the user whose user identifier was used to retrieve the one or more user data. The visualization infrastructure may then cause an aura comprising at least the one or more user data to be displayed proximate to the second user.

According to some aspects of the invention, the light-based system for forming social connections comprising the localization system, the identification system, the memory, the visualization controller, the visualization infrastructure, and the one or more visualization actuators described above may further include an electronic mobile device proximate to a user of the system. The electronic mobile device may transmit a third signal indicative of a device identifier associated with the electronic mobile device. According to such of the invention, the localization system may determine the location and orientation of the electronic mobile device based on the third signal, and may determine the location and orientation of the user based on the location and orientation of the electronic mobile device. Additionally, the identification system may determine the user identifier based on the device identifier.

The light-based system for forming social connections disclosed above, according to various aspects of the invention, may further include one or more user interfaces for entering information. Such user interfaces may be used to enter into or delete from a memory, user data such as digital photographs and video that represent, for example, personal interests or recent past experiences of users. Such user interfaces may also be employed to enter into or delete from the memory, user identifiers, associations between user data and user identifiers, and information regarding the level of detail with which user data may be displayed in a user's aura. Additionally, such user interfaces may be employed for specifying permission to display specific user data. For example, by creating associations between one or more configurable display policies and one or more user data in the memory, a user may be able to dynamically control, using the configurable display policies present in the memory, circumstances under which certain user data may not be displayed. In some aspects of the invention, such user interfaces may also allow a user to select a graphical representation of an aura and browse the user data related to the selected aura.

There are several advantages to using a system in accordance with the present invention. First, unlike currently available social connection systems, the exemplary system enables a user to form remote light-based social connections without significantly detracting from the user's ability to simultaneously engage in social interaction with individuals present in the user's physical environment. Second, the exemplary system, unlike conventional social connection systems, enables a user to visually identify one or more potential social connections present in the user's physical environment by visually displaying, proximate to each potential social connections' person, relevant information such as recently performed recreational activities. Third, the exemplary system, unlike existing social connection systems, may additionally alert a user to proximally locate potential social connections using non-visually based cues comprising auditory cues such as sound effects or tactile cues such as vibrations, or a combination of types of cues. Moreover, the exemplary system, by enabling users to visually identify and observe potential social connections, makes it possible for users to take into account other relevant information, such as a potential social connection's body language or facial expression, in deciding whether or not to initiate social contact.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

DETAILED DESCRIPTION

Reference is now made in detail to illustrative embodiments of the invention, examples of which are shown in the accompanying drawings.

Figure 1A:
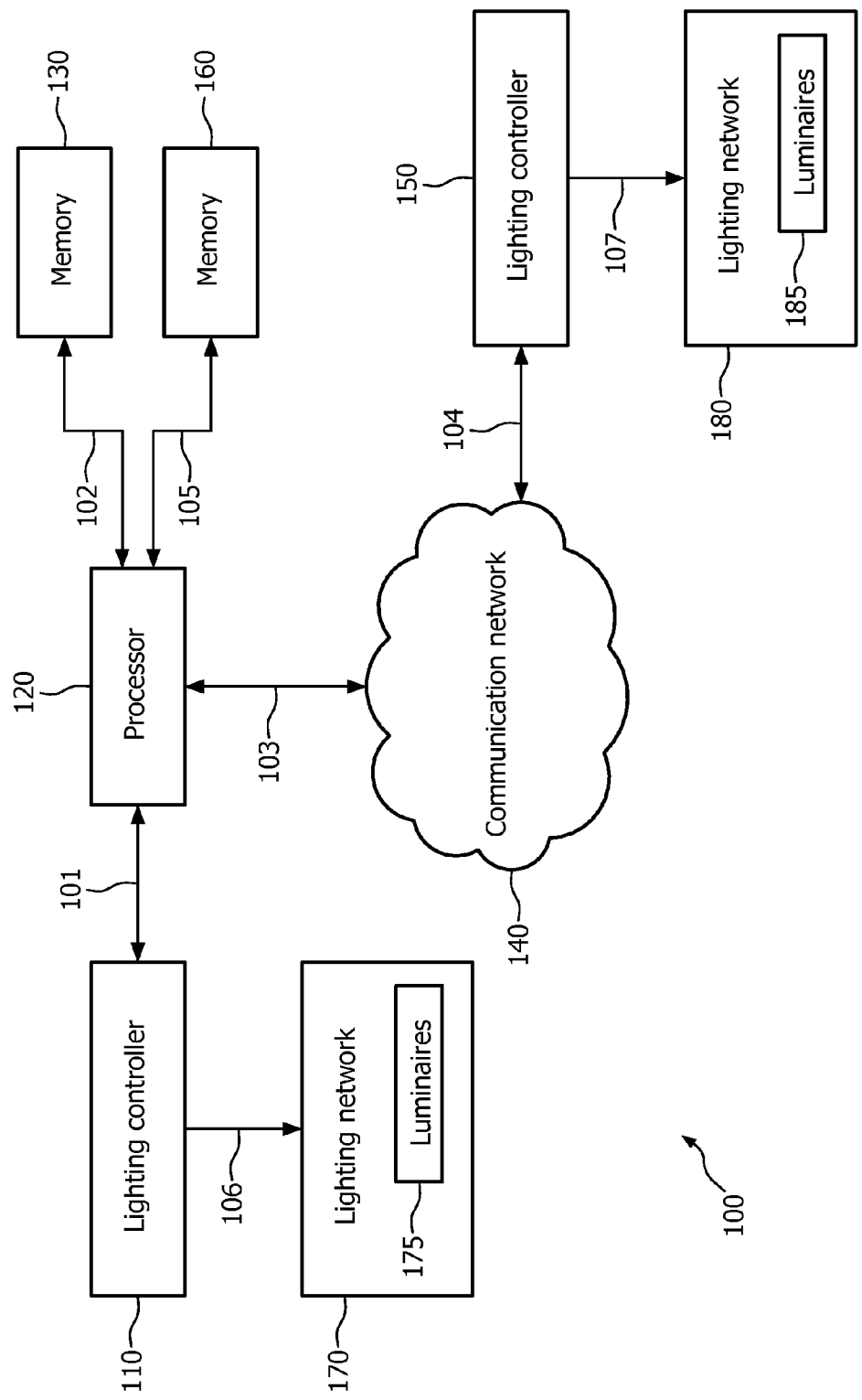
FIG. 1A illustrates a light-based system for forming social connections according to embodiments of the invention in which the system may employ multiple lighting controllers.

FIG. 1A illustrates a light-based system 100 for forming social connections according to many embodiments of the invention. System 100 includes lighting controller 110, processor 120, memory 130, communication network 140, lighting controller 150, and memory 160.

Lighting controller 110 controls, via link 106, a plurality of individually controllable luminaires 175 in lighting network 170 and transmits, via link 101, a first signal indicative of a first location identifier, and a second signal indicative of a first localized light setting associated with the first location identifier.

The term "lighting controller" is used herein generally to describe various apparatus relating to the operation of one or more luminaires. A controller, including a lighting controller, may be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessor and associated circuitry) to perform other functions. Examples of controller components that may be employed in various embodiments of the present disclosure include, but are not limited to, conventional microprocessors, application specific integrated circuits (ASICS), and field-programmable gate arrays (FPGAs).

The plurality of individually-controllable luminaires 175 controlled by lighting controller 110 include, in some embodiments of system 100, one or more luminaires that are installed in fixed locations, and are capable of communicating with the lighting controller via lighting network 170. Lighting network 170 may include, for example, dedicated hardware communication links. In some other embodiments, individually-controllable luminaires include one or more addressable luminaires which communicate through a lighting network that includes other types of communication links, for example, an Ethernet or a wireless network connection. Communications between the lighting controller and individually-controllable luminaires can include commands sent from the lighting controller to the luminaires. These commands may cause one or more of luminaires 175 to, for example, turn on, turn off, decrease or increase intensity, or change the spectral power distribution of their illumination.

The term "luminaire" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The term "light source" should be understood to refer to any one or more of a variety of radiation sources, including, but not limited to, LED-based sources, incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

A given luminaire may be configured to generate electromagnetic radiation within the visible spectrum, outside the visible spectrum, or a combination of both. Hence, the terms "light" and "radiation" are used interchangeably herein. Additionally, a luminaire may include as an integral component one or more filters (e.g., color filters), lenses, or other optical components. Also, it should be understood that luminaires may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more luminaires. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources). The term "spectral power distribution" is understood to refer to the power per unit area per unit wavelength of an illumination, or the per-wavelength contribution to any radiometric quantity (e.g. radiant energy, radiant flux, radiant intensity, radiance, irradiance, radiant exitance, or radiosity).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the term "different colors" implicitly refers to multiple spectra having different wavelength components and/or bandwidths. It also should be appreciated that the term "color" may be used in connection with both white and non-white light.

As illustrated in FIG. 1A, in light-based system 100, processor 120 receives from lighting controller 110, via link 101, the first signal indicative of a first location identifier and the second signal indicative of a first localized light setting. The processor subsequently determines the first localized light setting from the second signal and receives from memory 130, via link 102, at least one second location identifier associated with a second localized light setting, where the second localized light setting has a correlation to the first localized light setting.

The term "processor" as used herein refers to any circuitry that processes arithmetic and logic instructions, such as a central processing unit of a computer capable of manipulating information. Embodiments of processor 120 include, but are not limited to, conventional microprocessors, application specific integrated circuits (ASICs), and field-programmable gate arrays (FPGAs).

Memory 130, of light-based system 100, associates at least the first location identifier with the first localized light setting. Embodiments of memory 130 and memory 160 include various types of storage media, e.g., volatile and non-volatile computer memory such as RAM, PROM, EPROM and EEPROM, floppy disks, compact disks, optical disks, magnetic tape. In some implementations, the storage media may be encoded with one or more programs capable of being executed on a processor. Various storage media may be transportable, such that the one or more programs stored thereon can be loaded into a processor so as to implement various aspects of the present invention discussed herein. The terms "program" or "computer program" are used herein in a generic sense to refer to any type of computer code (e.g. software or microcode) that can be employed to program one or more processors.

Communication network 140, of light-based system 100, is a network used by the various components of light-based system 100, in order to communicate information. The communication network receives, via link 103, the at least one second location identifier from processor 120. As depicted in FIG. 1A, communication network also transmits, via link 104, a third signal indicative of a potential for a light-based connection. Embodiments of communication network 140 include, for example, a wired network, a wireless network, or a combination of different wired and wireless networks. Moreover, communication network may involve different technologies, e.g., infrared communications, fiber optics communications, or computer networking technologies, for example, Ethernet technologies. Communication network may also include a local area network (LAN) or a wireless local area network (WLAN). For example, communication network may include wireless computer communication technologies between processor 120 and lighting controller 150, combined with dedicated hardwired communication technologies between the lighting controller and the one or more individually-controllable luminaires controlled by the lighting controller.

The term "network" as used herein refers to any interconnection of two or more devices (including lighting controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

Lighting controller 150, according to light-based system 100, controls, via link 107, individually controllable luminaires 185 proximate to a location associated with the at least one second location identifier. Lighting controller 150 receives, from communication network 140, via link 104, the third signal indicative of a potential for a light-based connection. The lighting controller subsequently transmits, in response, via the communication network, a fourth signal indicative of an interest in establishing a light-based connection. The lighting controller may be any type of lighting controller described with respect to lighting controller 110. The processor receives from communication network 140, via link 103, the fourth signal indicative of an interest in establishing a light-based connection. The processor subsequently creates, via link 105, an association in memory 160, between the first location identifier and the at least one second location identifier.

According to some embodiments of the invention, system 100 may feature a first user interface for communicating localized light settings to lighting controller 110 and a second user interface for communicating localized light settings to lighting controller 150. The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

In other embodiments of the invention involving system 100, the correlation between the first localized light setting and the second localized light setting may be based on a difference between a first chromaticity associated with the first localized light setting, and a second chromaticity associated with the second localized light setting. The correlation between the first and second localized light settings may also be based on a difference between a first brightness associated with the first localized light setting, and a second brightness associated with the second localized light setting.

In yet other embodiments of the invention involving system 100, the association between the first location identifier and the at least one second location identifier is made when the correlation between the first localized light setting and the second localized light setting is at most an existing or predetermined threshold difference between a first chromaticity associated with the first localized light setting, and a second chromaticity associated with the second localized light setting. The association may also be made when the correlation between the first and second localized light settings is at most an existing or predetermined threshold difference between a first brightness associated with the first localized light setting, and a second brightness associated with the second localized light setting. Additionally, the thresholds related to the correlation between the first localized light setting and the second localized light setting may be adjustable.

According to some embodiments of system 100, the third signal indicative of a potential for a light-based connection may comprise a signal indicative of an increase in a brightness associated with the second localized light setting. Additionally, the fourth signal indicative of an interest in establishing a light-based connection may comprise a signal indicative of an increase in a brightness associated with the first localized light setting.

In other embodiments of system 100, subsequent to processor 120 creating the association in memory 160 between the first location identifier and the second location identifier, communication network 140 may receive a fifth signal indicative of a third localized light setting, from lighting controller 110. In some embodiments, upon determination that memory 160 already contains an association between the first location identifier and the second location identifier, communication network 140 may transmit the fifth signal to lighting controller 150. An individual utilizing system 100 to identify potential light-based connections, may therefore proceed to communicate with such identified connections once the required light-based connections have been recorded. In some embodiments of system 100, the third localized light setting may comprise a light setting specifying a selected color and brightness. In other embodiments, the third localized light setting may comprise a light setting specifying a selected sequence of colors and associated brightnesses. In still other embodiments, the third localized light setting may symbolize a communication element comprising a character in the alphabet, a numeral, a word or a phrase.

According to some embodiments of system 100, subsequent to processor 120 creating the association in memory 160 between the first location identifier and the second location identifier, communication network 140 receives an additional signal from lighting controller 110. According to some embodiments, the additional signal may be indicative of data comprising a textual character, a static image, a scent, a video file, and an audio file. Additionally, upon determining that memory 160 already contains the association between the first location identifier and the second location identifier, the processor may transmit the additional signal to lighting controller 150.

Figure 1B:
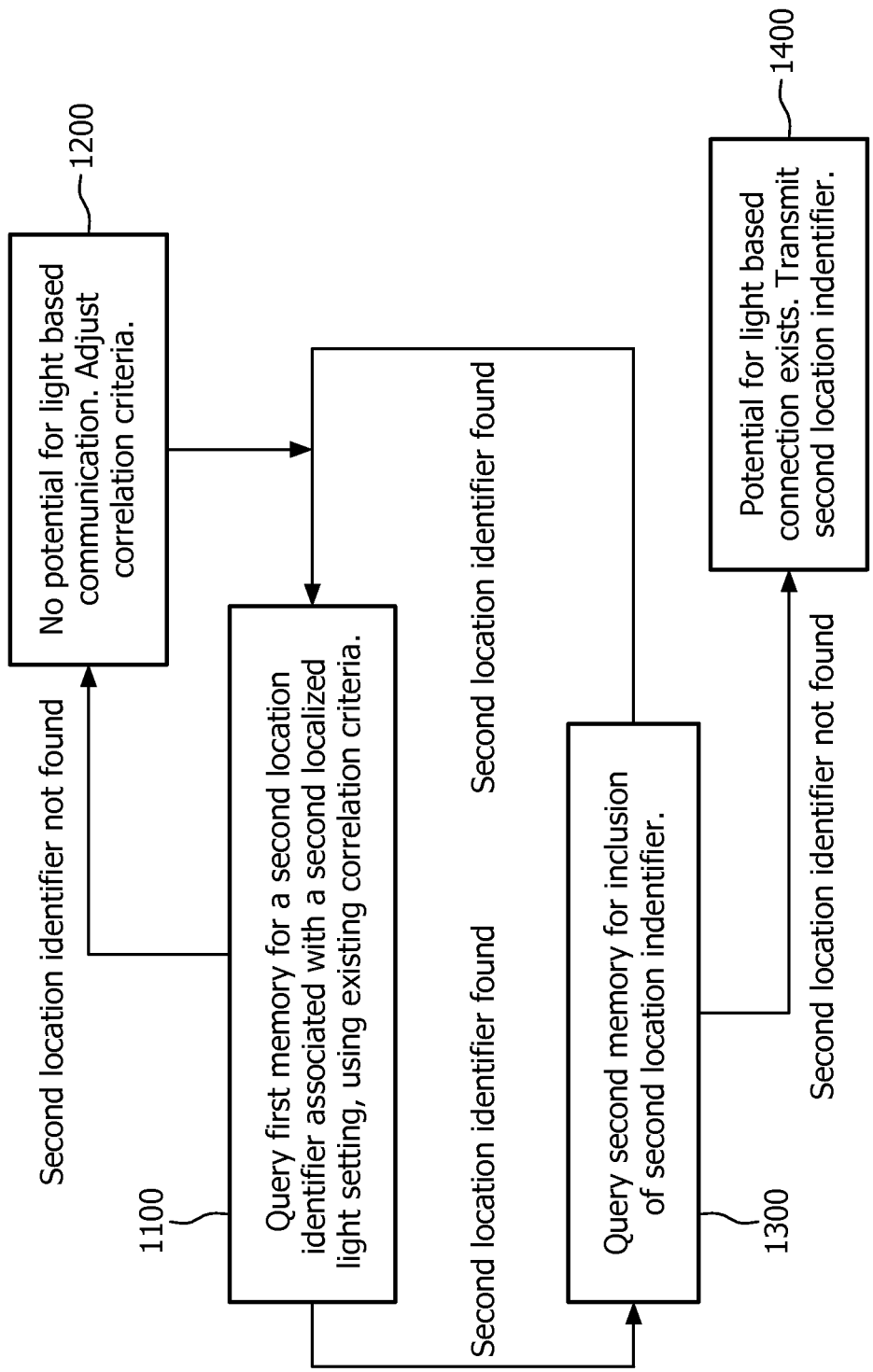
FIG. 1B illustrates exemplary steps executed by one or more components included in the embodiment of the light-based system illustrated in FIG. 1A.

FIG. 1B illustrates aspects of embodiments of system 100 that are involved in the discovery of potential light-based connections. As depicted in FIG. 1B, a first memory is queried for at least one second location identifier associated with a second localized light setting, where the second localized light setting has a correlation to a first localized light setting (1100). A predetermined or existing correlation criteria may be used to decide whether the second localized lighting setting has a correlation to the first localized light setting. The first memory queried may be memory 130. If the query of the first memory fails to identify a second location identifier associated with the second localized light setting and having a correlation to the first localized light setting, no potential light-based connections have been discovered and the predetermined correlation criteria may be relaxed (1200). On the other hand, if the query of the first memory results in identifying the at least one second location identifier, a second memory is queried in order to determine if the second memory contains the at least one second location identifier (1300). The second memory queried may be memory 160. If the query of the second memory results in an indication that the second memory does not include the at least one second location identifier, a potential light-based connection is found to exist and the at least one second location identifier may be transmitted (1400) by processor 120. On the other hand, if the query of the second memory results in an indication that the at least one second location identifier already exists in the second memory, the query is abandoned and the first memory is again queried for at least one next second location identifier associated with a next second localized light setting, where the next second localized light setting has a correlation to the first localized light setting (1100).

Figure 2:
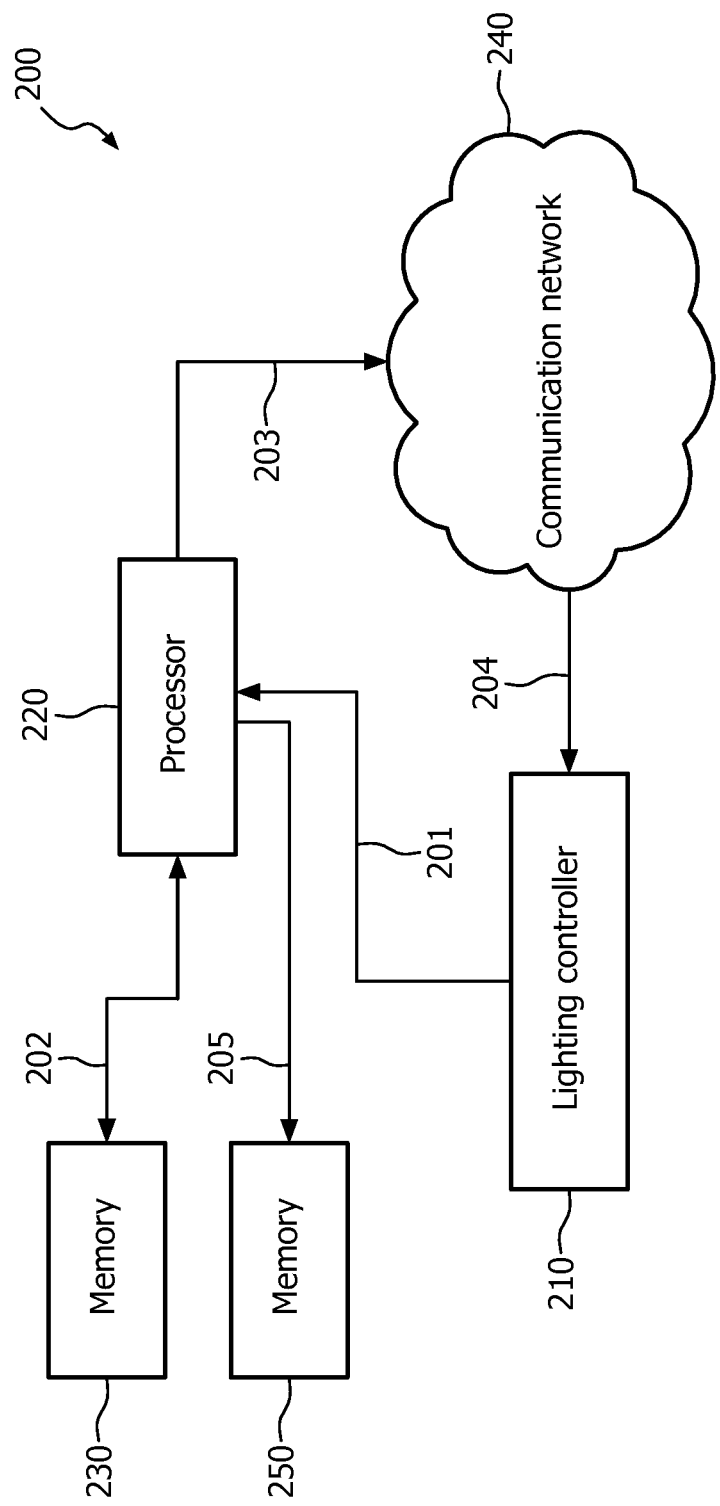
FIG. 2 illustrates a light-based system for forming social connections according to some other embodiments of the invention in which a single lighting controller is employed.

FIG. 2 illustrates a light-based system 200 for forming social connections according to some embodiments of the invention. System 200 includes lighting controller 210, processor 220, memory 230, communication network 240, and memory 250.

Lighting controller 210, according to light-based system 200, controls a plurality of individually controllable luminaires in a lighting network and transmits, via link 201, a first signal indicative of a first location identifier and a second signal indicative of a first localized light setting. The first localized light setting is a light setting associated with the first location identifier. Lighting controller 210 may be any type of lighting controller described with respect to lighting controller 110 of FIG. 1A.

Memory 230, of light-based system 200, associates at least the first location identifier with the first localized light setting. Memory 230 may be any type of memory described with respect to memory 130 of FIG. 1A.

Processor 220, of light-based system 200, determines the first localized light setting from the second signal received from lighting controller 210. Processor 220 also receives from memory 230, via link 202, at least one second location identifier associated with a second localized light setting, where the second localized light setting has a correlation to the first localized light setting. Processor 220 may be any type of processor described with respect to processor 120 of FIG. 1A.

As illustrated in FIG. 2, communication network 240 receives the at least one second location identifier from processor 220 via link 203. Communication network 240 also transmits, via link 204, a third signal indicative of a potential for a light-based connection. Communication network 240 may be any type of communication network described with respect to communication network 140 of FIG. 1A.

Lighting controller 210, of light-based system 200, receives, via link 204, the third signal indicative of a potential for a light-based connection, and transmits in response, via link 201, a fourth signal indicative of an interest in establishing a light-based connection. Processor 220, receiving the fourth signal from lighting controller 210, creates an association in memory 250, via link 205, between the first location identifier and the at least one second location identifier.

According to some embodiments of light-based system 200, system 200 further includes at least a first user interface and at least a second user interface for communicating light settings to lighting controller 210. The first and second user interfaces, not shown in FIG. 2, may be any type of user interface described with respect to light-based system 100 of FIG. 1A.

In various embodiments of light-based system 200, subsequent to processor 220 creating the association in memory 250 between the first location identifier and the second location identifier, lighting controller 210 transmits a signal indicative of the first location identifier and another signal indicative of a third localized light setting associated with the first location identifier. Upon determining that memory 250 contains the association between the first location identifier and the at least one second location identifier, and upon receipt of the signals indicative of the first location identifier and the third localized light setting, lighting controller 210 controls a plurality of individually controllable luminaires, not shown, at a location associated with the at least one second location identifier. The lighting controller controls the plurality of individually controllable luminaires proximate to the location associated with the at least one second location identifier such that the luminaires create ambient lighting according to the third localized light setting. The individually controllable luminaires may be any type of individually controllable luminaires described with respect to light-based system 100 of FIG. 1A.

According to some other embodiments of light-based system 200, subsequent to processor 220 creating the association in memory 250 between the first location identifier and the second location identifier, lighting controller 210 transmits a signal indicative of the first location identifier and another signal indicative of data. The data may comprise at least one of the following: a textual character, a static image, a scent, a video file and an audio file. Upon a determination that memory 250 contains the association between the first location identifier and the at least one second location identifier, the lighting controller subsequently receives a signal indicative of the at least one second location identifier and another signal indicative of the data.

Figure 3:
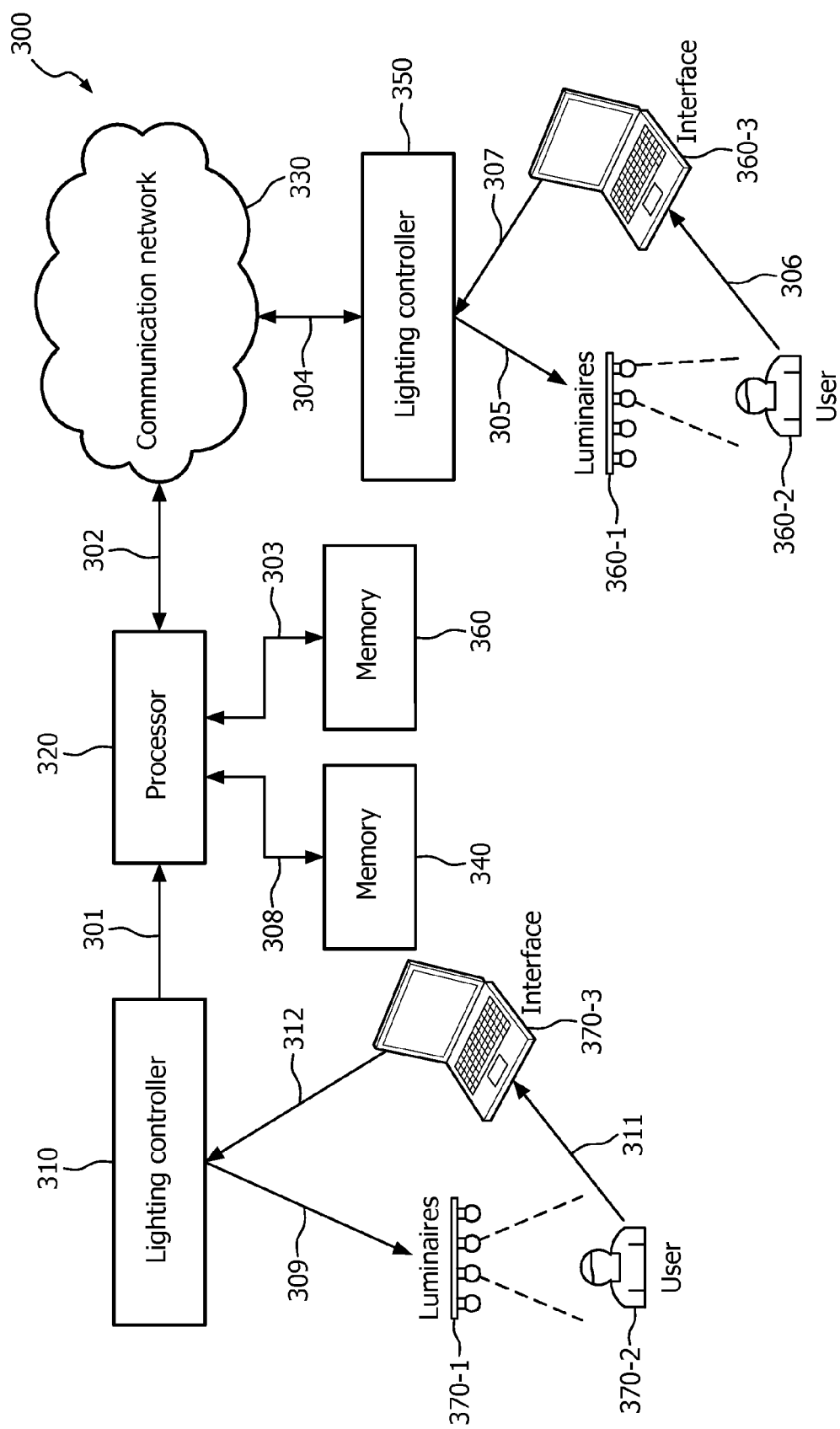
FIG. 3 illustrates a light-based system for forming social connections according to other embodiments of the invention in which the system's interactions with its users is detailed.

FIG. 3 illustrates a light-based system 300 for forming social connections according to various embodiments of the invention. System 300 includes lighting controller 310, processor 320, communication network 330, memory 340, lighting controller 350, memory 360, one or more individually controllable luminaires 370-1, user interface 370-3, one or more individually controllable luminaires 360-1, and user interface 360-3.

Lighting controller 310 controls one or more individually controllable luminaires 370-1 in a lighting network. User 370-2, situated proximate to luminaires 370-1 may specify a first localized light setting by communicating with user interface 370-3. User 370-2 may communicate with user interface 370-3 via link 311. Lighting controller 310 may receive, via link 312, the first localized light setting, and proceed to control luminaires 370-1 such that they create ambient lighting according to the first localized light setting. Lighting controller 310 may also transmit, via link 301, a first signal indicative of a first location identifier and a second signal indicative of the first localized light setting. Lighting controller 310 may be any type of lighting controller described with respect to lighting controller 110 of FIG. 1A.

Processor 320 receives, via link 301, the first signal and the second signal from lighting controller 310, determines the first localized light setting from the second signal and receives, via link 308, from memory 340, at least one second location identifier associated with a second localized light setting, where the second localized light setting has a correlation to the first localized light setting. Processor 320 may be any type of processor described with respect to processor 120 of FIG. 1A.

Memory 340 associates at least the first location identifier with the first localized light setting. Memory 340 may be any type of memory described with respect to memory 130 of FIG. 1A. Communication network 330 receives from processor 320, via link 302, the at least one second location identifier, and transmits a third signal indicative of a potential for a light-based connection. Communication network 330 may be any type of communication network described with respect to communication network 140 of FIG. 1A.

Lighting controller 350, at a location associated with the at least one second location identifier, receives from communication network 330, via link 304, the third signal indicative of a potential for a light-based connection. In some embodiments of system 300, the third signal may comprise a signal indicative of an increase in the brightness associated with the second localized light setting. In such embodiments, lighting controller 350 may control individually controllable luminaires 360-1 proximate to the location identified by the at least one second location identifier such that the increase in brightness specified by the third signal is reflected in the ambient lighting at the location identified by the at least one second location identifier. User 360-2, at the location identified by the at least one second location identifier, sensing the increase in the brightness of the ambient lighting, and recognizing this to be an attempt at forming a light-based social connection, may, in response, change the second localized light settings. Lighting controller 350 may then transmit, in response, via communication network 330, a fourth signal indicative of an interest in establishing a light-based connection. Processor 320, receiving the fourth signal, via link 302, may then create, via link 303, an association in memory 360 between the first location identifier and the at least one second location identifier. Lighting controller 350 may be any type of lighting controller described with respect to lighting controller 110 of FIG. 1A.

Figure 4:
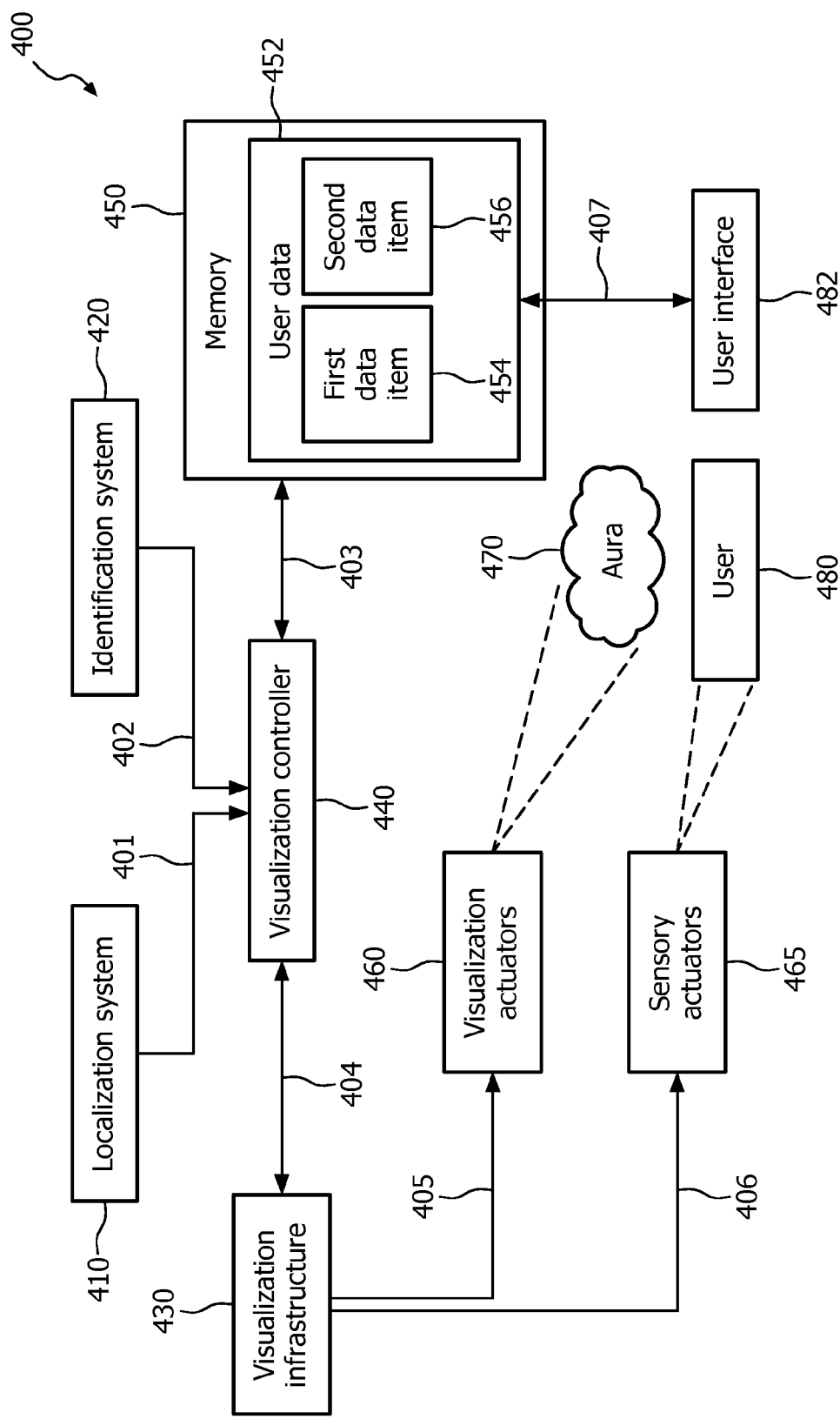
FIG. 4 illustrates a light-based system for forming social connections according to other embodiments of the invention in which auras are employed.

FIG. 4 illustrates a light-based system 400 for forming social connections according to many embodiments of the invention. System 400 includes localization system 410, identification system 420, visualization infrastructure 430, visualization controller 440, memory 450, and visualization actuators 460.

Localization system 410 determines a location and an orientation associated with a user 480 and transmits, via link 401, a first signal indicative of the location and the orientation of user 480. The localization system may employ various technologies for determining the location of a user including sensors, RFID tags, GPS technologies and triangulation. The localization system may also employ various techniques for determining the orientation of a user, the various technologies including gyroscope related technologies.

Localization system 410 may be implemented in numerous ways (e.g. such as with dedicated hardware, software, or a combination of hardware and software) to perform various functions discussed herein. The localization system may be implemented with or without employing a processor, and also may be implemented as a combination of dedicated hardware to perform some functions and a processor (e.g., one or more programmed microprocessors and associated circuitry) to perform other functions. The localization system may also be implemented using a plurality of modules designed to perform specific functions and to communicate information internally within the localization system as well as with external entities.

Identification system 420 determines a user identifier associated with user 480 and transmits, via link 402, a second signal indicative of the user identifier. According to some embodiments, identification system 420 determines the user identifier associated with user 480 by utilizing techniques for recognizing unique characteristics of user 480 and checking a memory for a user identifier associated with the unique characteristics. Techniques for recognizing unique characteristics include face recognition.

Identification system 420 may be implemented in numerous ways (e.g. such as with dedicated hardware, software, or a combination of hardware and software) to perform various functions discussed herein. The identification system may be implemented with or without employing a processor, and also may be implemented as a combination of dedicated hardware to perform some functions and a processor (e.g., one or more programmed microprocessors and associated circuitry) to perform other functions. The identification system may also be implemented using a plurality of modules designed to perform specific functions and to communicate information internally within identification system 420 as well as with external entities.

Memory 450 associates at least the user identifier with one or more user data 452. Memory 450 may be any type of memory described with respect to memory 130 of FIG. 1A.

Visualization controller 440 receives the first signal indicative of the location and orientation of user 480 and the second signal indicative of the user identifier. Visualization controller 440 then retrieves, via link 403, from memory 450, the one or more user data associated with user 480's user identifier. Visualization controller 440, according to many embodiments, also generates an aura-creation command based on a combination comprising the one or more user data and one or more of the following: location of the user, and the orientation of the user. According to some embodiments, the one or more user data includes one or more of the following: recent past experiences of the user, future plans of the user, and personal interests of the user.

Visualization controller 440 transmits, via link 404, the aura-creation command to visualization infrastructure 430 for controlling, via link 405, one or more visualization actuators 460, proximate to user 480, for visually displaying an aura 470. In various embodiments, the visualization infrastructure may provide visualization controller 440, via link 404, information relating to visualization infrastructure 430's capabilities. Visualization controller 440 may use the information relating to visualization infrastructure 430's capabilities to generate an aura creation command that takes into account visualization infrastructure 430's capabilities. For example, the visualization controller may generate an aura creation command that utilizes user data in the form of video data if the visualization infrastructure has the capability to display such data. According to many embodiments, aura 470 comprises at least the one or more user data associated with user 480. According to some embodiments, aura 470 comprises a pattern, sequence or color of light. The pattern, sequence or color of light may additionally convey a meaning such as an extent of interest in forming social connections and an interest in engaging in a particular activity. System 400 may further comprise, according to various embodiments, a user interface for associating a meaning with a pattern, sequence or color of light displayed in aura 470, and for retrieving the meaning associated with such a pattern, sequence or color of light. For example, a user may utilize the user interface of system 400 to retrieve a meaning associated with an aura displayed proximally to another user.

Visualization controller 440 may be implemented in numerous ways (e.g. such as with dedicated hardware, software, or a combination of hardware and software) to perform various functions discussed herein. A "processor" is one example of a visualization controller which employs one or more microprocessors that may be programmed using software (e.g., microcode) to perform various functions discussed herein. The visualization controller may be implemented with or without employing a processor, and also may be implemented as a combination of dedicated hardware to perform some functions and a processor (e.g., one or more programmed microprocessors and associated circuitry) to perform other functions. Visualization controller 440 may also be implemented using a plurality of modules designed to perform specific functions and to communicate information internally within visualization controller 440 as well as with external entities.

According to some embodiments of system 400, visualization infrastructure 430 may further control one or more sensory actuators 465 in order to display aura 470. The sensory actuators may include auditory actuators and olfactory actuators.

According to other embodiments of system 400, the one or more user data 452 retrieved from memory 450 may comprise a first data item 454 and a second data item 456. The first data item may be assigned a higher relevancy rating than the second data item, and visualization infrastructure 430 may control visualization actuators 460 such that the first data item is more centrally displayed in aura 470 than the second data item.

According to other embodiments of system 400, the one or more user data 452 retrieved from memory 450 may be further associated with metadata including temporal data. The one or more user data 452 associated with user 480 may also comprise at least a first data item associated with first metadata, and a second data item associated with second metadata. The first metadata and the second metadata may together indicate that the first data item is more recent than the second data item. Visualization controller 440 may, in some embodiments, generate the aura creation command transmitted via link 404 by additionally utilizing the first and second metadata such that aura 470 emphasizes the first data item over the second data item.

In various embodiments of system 400, visualization actuators 460 may include individually controllable luminaires in a lighting network, displays, projectors, and pixilated light tiles. According to some embodiments of system 400, visualization actuators may also be present on surfaces such as electronic fabric worn by user 480.

According to some embodiments of system 400, aura 470 may comprise at least one of the following: single colored lights, multi-colored light patterns, images, and videos. In some other embodiments of system 400, visualization controller 440 may generate and transmit an aura-power-off command. Visualization infrastructure 430 may receive the aura-power-off command and control visualization actuators 460 proximate to user 480 such that aura 470 is made invisible.

According to some other embodiments of the invention, system 400 includes an electronic mobile device, not shown, proximate to user 480. The electronic mobile device may transmit a signal indicative of its own device identifier, and may transmit another signal indicative of a location and an orientation of the electronic mobile device. Localization system 410 may receive the signal indicative of the location and the orientation of the electronic mobile device, and determine the electronic mobile device's location and orientation. The localization system may also determine the location and the orientation of the user based on the location and orientation of the electronic mobile device. Identification system 420 may receive the signal indicative of the device's identifier, determine the device identifier of the electronic mobile device and determine user 480's user identifier based on the device identifier.

According to various embodiments of the invention, system 400 further comprises one or more user interfaces 482 for modifying information in memory 450, adding information to memory 450, or deleting information from memory 450. The information modified, added or deleted may include user data, user identifiers, associations between user data and user identifiers, and permission to display user data. Permission to display user data may comprise at least one association between one or more configurable display policies and the one or more user data in memory 450. The one or more configurable display policies may control the circumstances under which the one or more user data may be displayed as part of aura 470.

According to some embodiments of system 400, visualization controller 440 generates the aura-creation command based further on an automatic determination of the appropriateness of displaying the one or more user data associated with user 480. The automatic determination may comprise determining whether the one or more user data is associated with a display policy that restricts display of the one or more user data. For example, if a display policy restricts the display of certain user data in certain types of locations, the aura-creation command may be generated based on an automatic determination that the restricted user data should not be used in creating the aura.

According to some other embodiments of system 400, user 480 may be tracked. The tracking may include localization system 410 periodically determining an updated location and an updated orientation of the user, and periodically transmitting a signal indicative of the updated location and the updated orientation of the user. The tracking may also include visualization controller 440 periodically receiving the signal indicative of the updated location and updated orientation of user 480, and periodically generating an updated aura-creation command based additionally on the updated location and updated orientation of the user.

Figure 5:
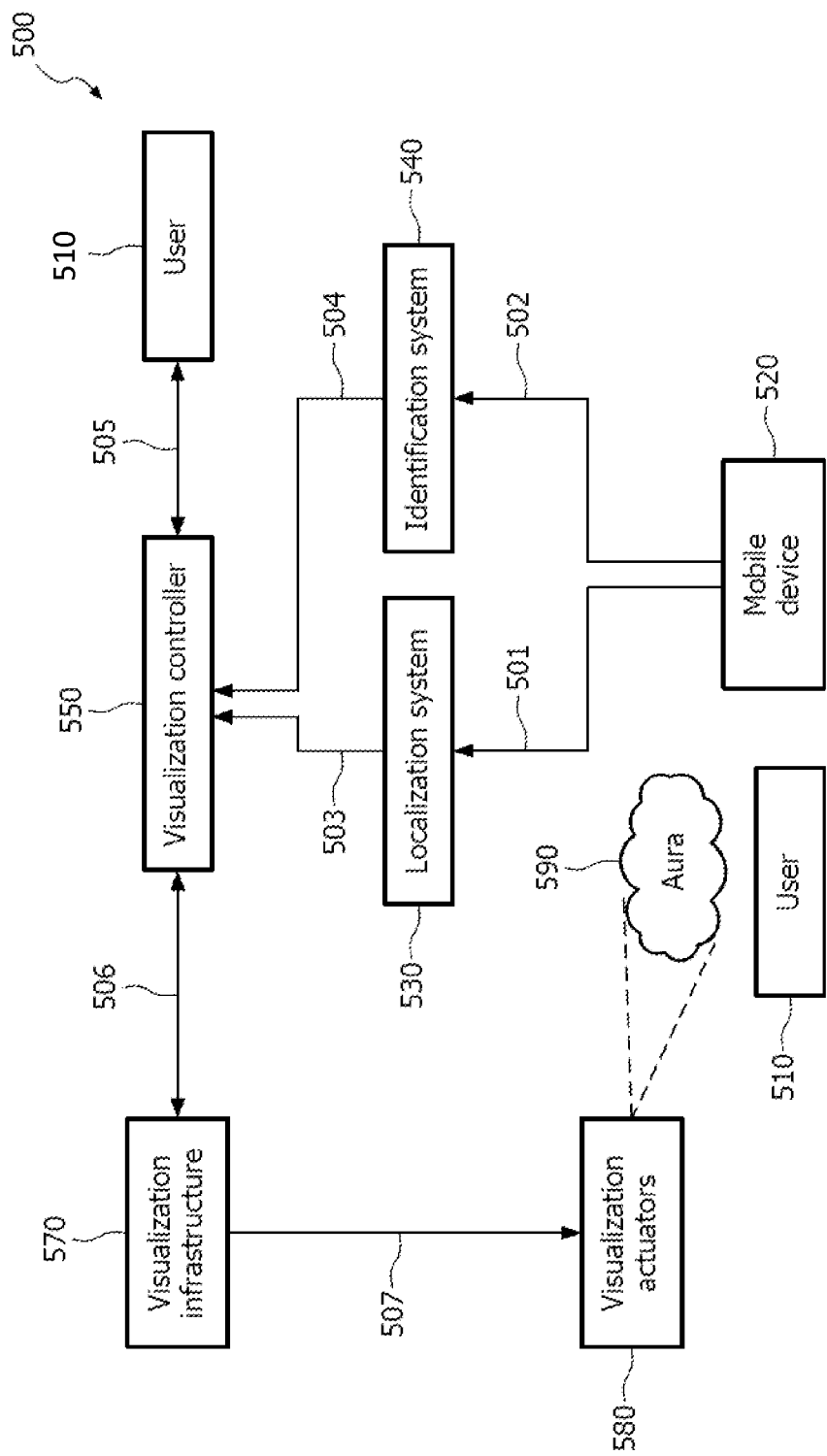
FIG. 5 illustrates a light-based system for forming social connections according to some embodiments of the invention in which one or more mobile electronic devices are employed.

FIG. 5 illustrates a light-based system 500 for forming social connections according to some other embodiments of the invention. As illustrated in FIG. 5, System 500 includes electronic mobile device 520, localization system 530, identification system 540, visualization controller 550, memory 560, visualization infrastructure 570, and visualization actuators 580.

Electronic mobile device 520, proximate to a user 510, transmits a signal indicative of a device identifier for mobile device 520. Exemplary embodiments of electronic mobile device 520 include a mobile phone, a SMS device, a personal digital assistant, a BLACKBERRY device, a IPHONE device, and a device including a programmable RFID tag.

Localization system 530 receives, via link 501, the signal indicative of mobile device 520's device identifier, and based on this signal, determines a location and an orientation of mobile device 520. Localization system 530 additionally determines a location and an orientation associated with user 510 based on the location and orientation of mobile device 520. The localization system then transmits a signal indicative of the location and the orientation of user 510. According to some embodiments, the localization system determines the location of the mobile device using one or more technologies such as GPS, assisted GPS, triangulation, signal strength analysis, and accelerometer technology. Localization system 530 may be any type of localization system described with respect to localization system 410 of FIG. 4.

Identification system 540 receives, via link 502, the signal indicative of the device identifier for mobile device 520, and determines a user identifier associated with user 510 based on the device identifier for mobile device 520. Identification system 540 additionally transmits a signal indicative of the user identifier. Identification system 540 may be any type of identification system described with respect to identification system 420 of FIG. 4.

Memory 560 associates at least the user identifier of user 480 with one or more user data. Memory 560 may be any type of memory described with respect to memory 130 of FIG. 1A.

Visualization controller 550 receives, via link 503, the signal indicative of the location and the orientation of mobile device 520. Visualization controller 550 also receives, via link 504, the signal indicative of user 510's user identifier, retrieves from memory 560, via link 505, the one or more user data associated with the user identifier, and generates an aura-creation command based on a combination comprising the one or more user data and one or more of the following: the location of user 510, and the orientation of user 510. The visualization controller also transmits, via link 506, the aura-creation command. Visualization infrastructure 570 receives the aura creation command and controls, via link 507, one or more visualization actuators 580 that are proximate to user 510. Visualization actuators 580 visually display aura 590 comprising at least the one or more user data associated with user 510. Visualization controller may be any type of visualization controller described with respect to visualization controller 440 of FIG. 4.

Figure 6:
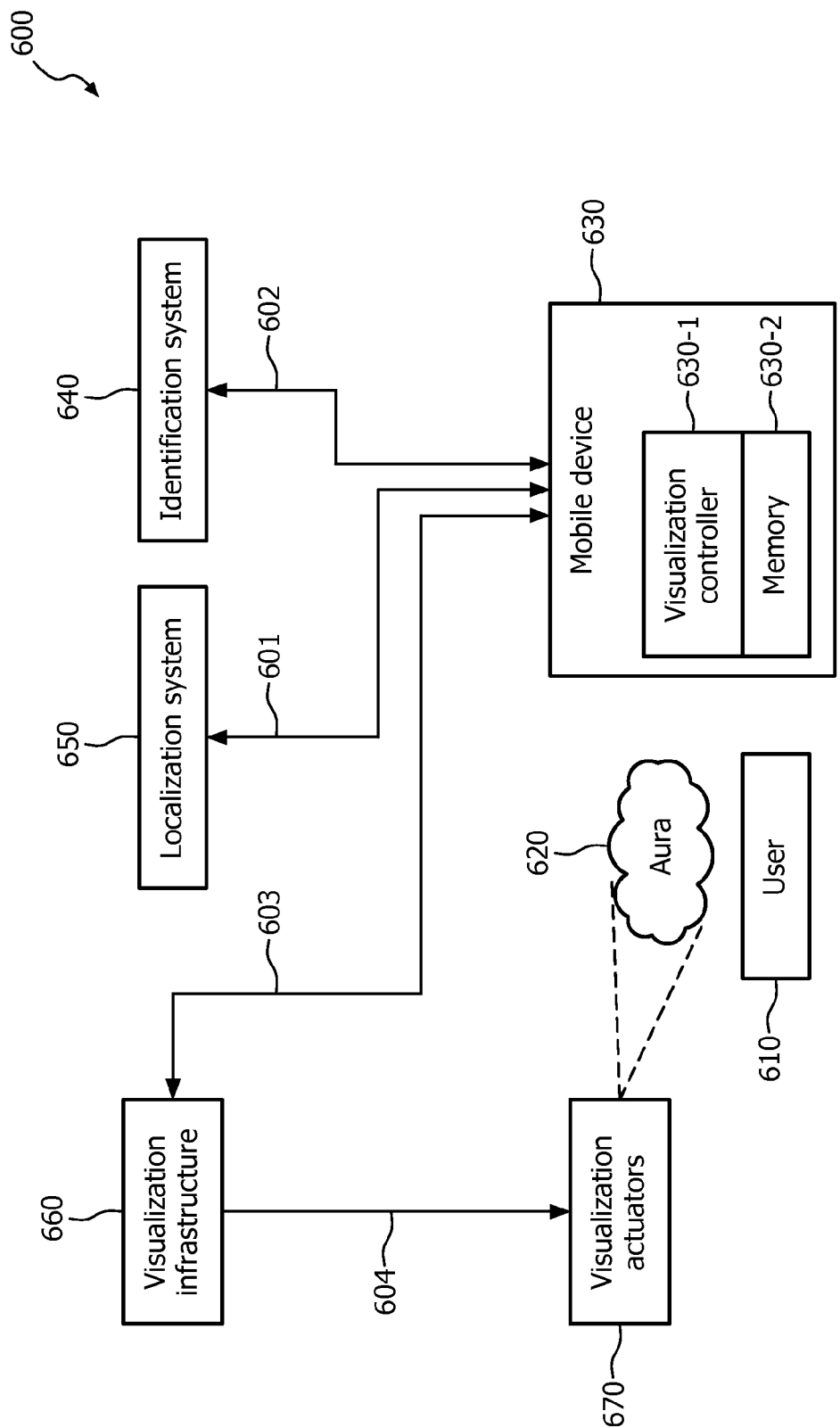
FIG. 6 illustrates a light-based system for forming social connections according to other embodiments of the invention, in which visualization controllers and memories may be included within electronic mobile devices.

FIG. 6 illustrates a light-based system 600 for forming social connections according to some other embodiments of the invention. As illustrated in FIG. 6, system 600 includes at least electronic mobile device 630, identification system 640, localization system 650, visualization controller 630-1, memory 630-2, visualization infrastructure 660, and visualization actuators 670.

Electronic mobile device (mobile device) 630, proximate to a user 610, transmits a signal indicative of a device identifier for mobile device 630. Mobile device 630 includes visualization controller 630-1 and memory 630-2. Mobile device 630 may be any type of electronic mobile device described with respect to electronic mobile device 520 of FIG. 5. Visualization controller 630-1 may be any type of visualization controller described with respect to visualization controller 440 of FIG. 4. Memory 630-2 may be any memory described with respect to memory 130 of FIG. 1A.

Localization system 650 receives the signal indicative of the device identifier for mobile device 630 and, based on this signal, determines a location and an orientation of mobile device 630. The localization system additionally determines a location and an orientation for user 610 based on the location and orientation of mobile device 630, and transmits, via link 601, a signal indicative of the location and the orientation of user 610. Localization system 650 may be any type of localization system described with respect to localization system 410 of FIG. 4.

Identification system 640 receives, via link 602, the signal indicative of the device identifier for mobile device 630, and determines a user identifier associated with user 610, based on the device identifier for mobile device 630. The identification system additionally transmits, via link 602, a signal indicative of the user identifier associated with user 610. Identification system 640 may be any type of identification system described with respect to identification system 420 of FIG. 4.

Visualization controller 630-1, included within mobile device 630, receives the signal indicative of the location and the orientation of user 610, receives the signal indicative of the user identifier associated with user 610, and retrieves from memory 630-2, also included within mobile device 630, the one or more user data associated with the user identifier associated with user 610. Visualization controller 630-1 also generates an aura-creation command based on a combination comprising the one or more user data and one or more of the following: the location of user 610, and the orientation of user 610. Mobile device 630 then transmits, via link 603, the aura-creation command to visualization infrastructure 660. Visualization infrastructure 660 then controls, via link 604, the one or more visualization actuators 670 that are proximate to user 610. Visualization actuators 670 visually display aura 620 comprising at least the one or more user data associated with user 610. Visualization controller 630-1 may be any type of visualization controller described with respect to visualization controller 440 of FIG. 4.

Figure 7:
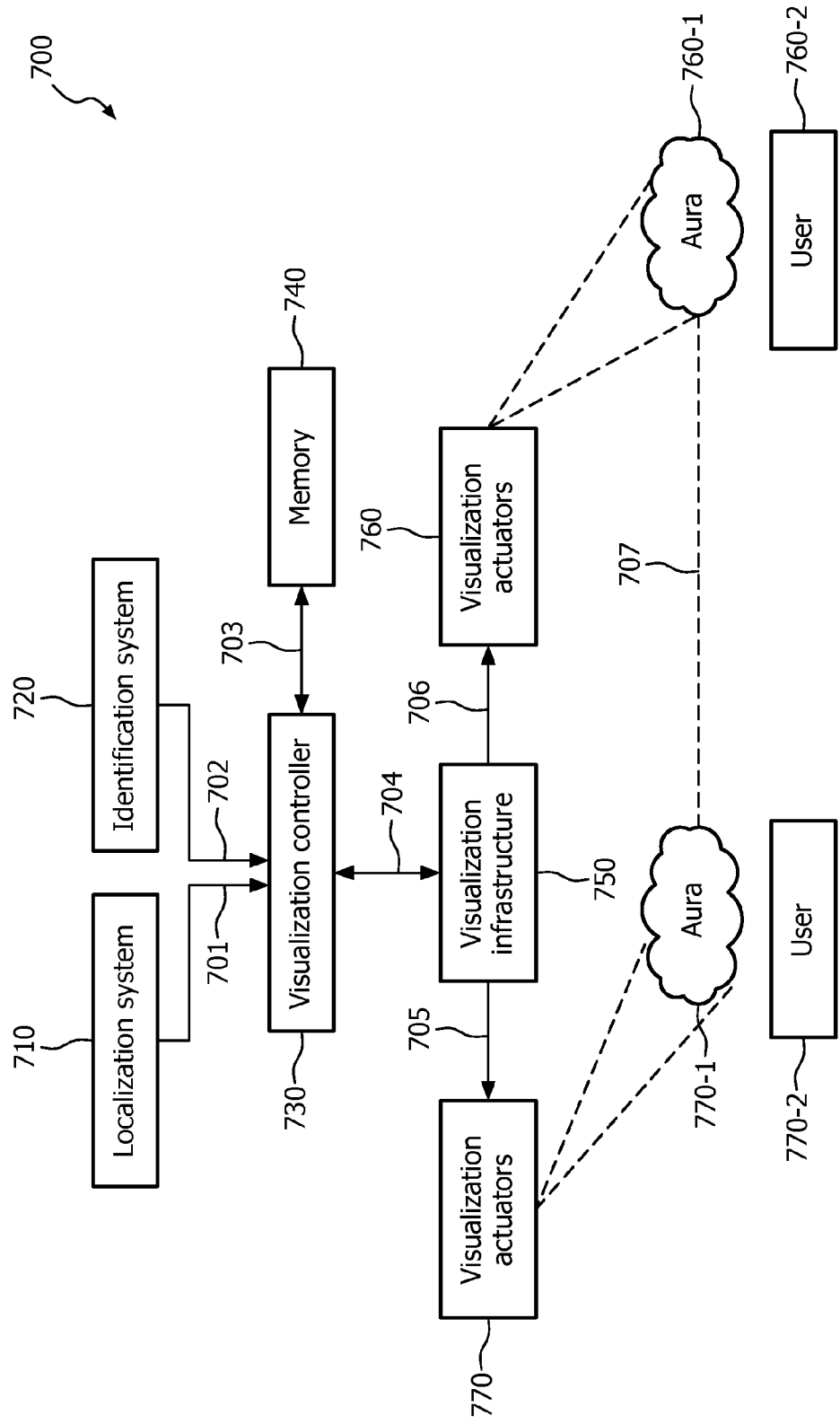
FIG. 7 illustrates a light-based system for forming social connections according to other embodiments of the invention involving auras.

FIG. 7 illustrates a light-based system 700 for forming social connections according to some embodiments of the invention. As illustrated in FIG. 7, system 700 includes localization system 710, identification system 720, visualization controller 730, memory 740, visualization infrastructure 750, one or more visualization actuators 760, and one or more visualization actuators 770.

Localization system 710 determines a location and an orientation associated with a user 770-2 and transmits, via link 701, a signal indicative of the location and the orientation of user 770-2. Localization system 710 also determines a location and an orientation of a user 760-2 and transmits, via link 701, another signal indicative of the location and the orientation of user 760-2. Localization system 710 may be any type of localization system described with respect to localization system 410 of FIG. 4.

Identification system 720 determines a user identifier associated with user 770-2 and transmits, via link 702, a signal indicative of the user identifier associated with user 770-2. Identification system 720 also determines a user identifier associated with user 760-2 and transmits, via link 702, a signal indicative of the user identifier associated with user 760-2. Identification system 720 may be any type of identification system described with respect to identification system 420 of FIG. 4.

Memory 740 associates at least the user identifier of user 770-2 with one or more user data, and at least the user identifier of user 760-2 with one or more user data. Memory 740 may be any type of memory described with respect to memory 130 of FIG. 1A.

Visualization controller 730 receives the signal indicative of the location and orientation of user 770-2 as well as the signal indicative of the user identifier associated with user 770-2, and retrieves from memory 740, via link 703, the one or more user data associated with the user 770-2's user identifier. Visualization controller 730 also receives the signal indicative of the location and orientation of user 760-2 as well as the signal indicative of the user identifier associated with user 760-2, and retrieves from memory 740, via link 703, the one or more user data associated with the user 760-2's user identifier. Visualization controller 730 additionally generates a first aura-creation command based on a combination comprising the one or more user data associated with user 770-2 and one or more of the following: the location of user 770-2, and the orientation of user 770-2. Likewise, visualization controller 730 generates a second aura-creation command based on a combination comprising the one or more user data associated with user 760-2 and one or more of the following: the location of user 760-2, and the orientation of user 760-2. Visualization controller 730 may be any type of visualization controller described with respect to visualization controller 440 of FIG. 4.

Visualization controller 730 transmits, via link 704, the first and second aura-creation commands. Visualization infrastructure 750 receives the first and second aura-creation commands and controls, via link 705, visualization actuators 770 that are proximate to user 770-2, such that visualization actuators 770 visually display aura 770-1 proximate to user 770-2. Aura 770-1 comprises at least the one or more user data associated with user 770-2. Likewise, visualization infrastructure 750 controls, via link 706, visualization actuators 760 that are proximate to user 760-2. Visualization infrastructure 750 controls visualization actuators 760 such that visualization actuators 760 visually display aura 760-1 proximate to user 760-2. Aura 760-1 comprises at least the one or more user data associated with user 760-2. According to some embodiments, in response to detecting a correlation between the one or more user data associated with user 770-2 and the one or more user data associated with user 760-2, visualization infrastructure 750 further controls one or more visualization actuators to visually display a link between user 770-2 and user 760-2.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, any reference numerals in parentheses are merely for convenience shall not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The invention claimed is:

1. A light-based system for forming social connections comprising:
    a first lighting controller for controlling a first individually controllable luminaire in a lighting network and for transmitting a first signal indicative of a first location identifier and a second signal indicative of a first localized light setting;
    a first memory for associating at least the first location identifier with the first localized light setting;
    a processor for determining the first localized light setting from the second signal, and receiving from the first memory at least one second location identifier associated with a second localized light setting having a correlation to the first localized light setting;
    a communication network for receiving the at least one second location identifier from the processor and transmitting a third signal indicative of a potential for a light-based connection; and
    a second lighting controller at a location associated with the at least one second location identifier, for controlling a second individually controllable luminaire in a lighting network, for receiving the third signal from the communication network, and for transmitting, in response, via the communication network, a fourth signal indicative of an interest in establishing a light-based connection;
    wherein the processor, receiving the fourth signal, creates an association in a second memory between the first location identifier and the at least one second location identifier.

2. The light-based system of claim 1, wherein the individually controllable luminaire comprises a plurality of arrangements of one or more lighting units, and wherein the plurality of arrangements of one or more lighting units comprises one or more LED-based light sources.

3. The light-based system of claim 1, wherein the individually controllable luminaire comprises one or more LED-based light sources.

4. The light-based system of claim 1, further comprising a first user interface for communicating first light settings to the first lighting controller and a second user interface for communicating second light settings to the second lighting controller.

5. The light-based system of claim 1, wherein the correlation between the first localized light setting and the second localized light setting is based on:

a difference between a first chromaticity associated with the first localized light setting and a second chromaticity associated with the second localized light setting, or a difference between a first brightness associated with the first localized light setting and a second brightness associated with the second localized light setting.

6. The light-based system of claim 1, wherein the third signal indicative of the potential for the light-based connection comprises a signal indicative of an increase in a brightness associated with the second localized light setting;

wherein the fourth signal indicative of an interest in establishing a light-based connection comprises a signal indicative of an increase in a brightness associated with the first localized light setting; and wherein the fourth signal is temporally separated from the third signal by a predetermined interval.

7. The light-based system of claim 1, wherein the processor identifies the at least one second location identifier in the second memory and checks the first memory to identify a next second location identifier associated with a next second localized light setting having a correlation with the first localized light setting.

8. The light-based system of claim 1, wherein, subsequent to the processor creating the association in the second memory between the first location identifier and the at least one second location identifier, the communication network receives a fifth signal indicative of a third localized light setting from the first lighting controller; and wherein, upon determination that the second memory contains an association between the first location identifier and the at least one second location identifier, the communication network transmits the fifth signal to the second lighting controller.

9. The light-based system of claim 8, wherein the third localized light setting comprises a light setting specifying a selected color and brightness or a light setting specifying a selected sequence of colors with associated brightness; and wherein the third localized light setting symbolizes a communication element comprising at least one of the following: a character in the alphabet, a numeral, a word and a phrase.

10. The light-based system of claim 1, wherein, subsequent to the processor creating the association in the second memory between the first location identifier and the at least one second location identifier, the communication network receives an additional signal from the first lighting controller, the additional signal indicative of first data comprising at least one of the following: a textual character, a static image, a scent, a video file and an audio file; and wherein, upon determining that the second memory contains the association between the first location identifier and the second location identifier, the processor, transmits the additional signal to the second lighting controller.

11. A light-based system for forming social connections comprising:

a lighting controller for controlling an individually controllable luminaire in a lighting network and transmitting a first signal indicative of a first location identifier and a second signal indicative of a first localized light setting;

a first memory for associating at least the first location identifier with the first localized light setting;

a processor for determining the first localized light setting from the second signal, and receiving from the first memory at least one second location identifier associated with a second localized light setting having a correlation with the first localized light setting; and a communication network for receiving the at least one second location identifier from the processor and transmitting a third signal indicative of a potential for a light-based connection;

wherein the lighting controller receives the third signal and transmits, in response, a fourth signal indicative of an interest in establishing a light-based connection, and wherein the processor, receiving the fourth signal from the lighting controller, creates an association in a second memory between the first location identifier and the at least one second location identifier.

12. The light-based system of claim 11, wherein the individually controllable luminaire comprises a plurality of arrangements of one or more lighting units, and wherein the plurality of arrangements of one or more lighting units comprises one or more LED-based light sources.

13. The light-based system of claim 11, wherein the individually controllable luminaire comprises one or more LED-based light sources.

14. The light-based system of claim 11, further comprising at least a first user interface and at least a second user interface for communicating light settings to the lighting controller.

15. The light-based system of claim 11, wherein, subsequent to the processor creating the association in the second memory between the first location identifier and the second location identifier, the lighting controller transmits signals indicative of the first location identifier and a third localized light setting; and wherein, upon determining that the second memory contains the association between the first location identifier and the second location identifier, and upon receipt of signals indicative of the second location identifier and the third localized light setting, the lighting controller controls an individually controllable luminaire at the second location identifier to create light settings according to the third localized light setting.

16. The light-based system of claim 11, wherein, subsequent to the processor creating the association in the second memory between the first location identifier and the second location identifier, the lighting controller transmits signals indicative of the first location identifier and data comprising at least one of the following: a textual character, a static image, a scent, a video file and an audio file; and wherein, upon determination that the second memory contains the association between the first location identifier and the second location identifier, the lighting controller receives signals indicative of the second location identifier and the data.

17. A light-based system for forming social connections comprising:

a localization system for determining a location of a user and for transmitting a first signal indicative of the location of the user;

an identification system for determining a user identifier associated with the user, and for transmitting a second signal indicative of the user identifier;

a memory for associating the user identifier with one or more user data; and a visualization controller:
for receiving the first signal and the second signal,
for retrieving from the memory, the one or more user data associated with the user identifier,
for generating an aura-creation command based on a combination comprising the one or more user data and the location of the user, and
for transmitting the aura-creation command to a visualization infrastructure for controlling one or more visualization actuators proximate to the user for visually displaying an aura comprising at least the one or more user data.

18. The light-based system of claim 17, wherein the location of the user includes an orientation of the user.

19. The light-based system of claim 17, further comprising an electronic mobile device proximate to the user, for transmitting a third signal indicative of a device identifier for the electronic mobile device,
wherein the localization system determines the location of the electronic mobile device based on the third signal, and determines the location of the user based on the location of the electronic mobile device; and
wherein the identification system determines the user identifier based on the device identifier.

20. The light-based system of claim 19, wherein the electronic mobile device comprises one or more of: the visualization controller and the memory.

21. The light-based system of claim 17,
wherein the visualization controller generates an aura-power-off command; and
wherein the visualization infrastructure receives the aura-power-off command and controls the one or more visualization actuators proximate to the user such that the aura disappears.

22. The light-based system of claim 17, further comprising an electronic mobile device proximate to the user, the electronic mobile device transmitting a third signal indicative of a device identifier for the electronic mobile device and a fourth signal indicative of the location of the electronic mobile device,
wherein the localization system determines the location of the electronic mobile device based on the fourth signal, and determines the location of the user based on the location of the electronic mobile device; and
wherein the identification system determines the user identifier based on the third signal.

23. The light-based system of claim 17, wherein the one or more user data comprises at least one of the following: recent past experiences of the user, future plans of the user, and personal interests of the user.

24. The light-based system of claim 17, wherein the aura comprises at least one of the following: single colored lights, multi-colored light patterns, images, and videos.

25. The light-based system of claim 17,
wherein the one or more user data comprises a first data item and a second data item,
wherein the first data item is assigned a higher relevancy rating than the second data item; and
wherein the visualization infrastructure controls the one or more visualization actuators such that the first data item is more centrally displayed in the aura than the second data item.

26. The light-based system of claim 17,
wherein the visualization actuators comprise at least one of the following: individually controllable luminaires in a lighting network, displays, projectors, and pixilated light tiles; and
wherein the individually controllable luminaires comprise a plurality of arrangements of one or more lighting units; and
wherein the plurality of arrangements of one or more lighting units comprises one or more LED-based light sources.

27. The light-based system of claim 17, further comprising a user interface for modifying information in the memory, adding information to the memory, or deleting information from the memory, the information comprising one or more of:
the one or more user data, the user identifier, the association between the at least one user data and user identifier, and permission to display the at least one user data.

28. The light-based system of claim 17, wherein the visualization controller generates the aura-creation command based further on an automatic determination of the appropriateness of displaying the one or more user data, wherein the automatic determination comprises determining whether the one or more user data is associated with a display policy that restricts display of the one or more user data.

29. The light-based system of claim 19,
wherein the localization system determines the location of the mobile device by a technology comprising at least one of: GPS, assisted GPS, triangulation, signal strength analysis, and accelerometer technology; and
wherein the identification system determines the user identifier associated with the user by utilizing techniques for recognizing unique characteristics of the user and checking a second memory for a user identifier associated with the unique characteristics.

30. The light-based system of claim 17,
wherein the one or more user data is further associated with metadata comprising temporal data;
wherein the one or more user data comprises at least a first data item and a second data item, the first data item being associated with a first metadata and the second data item being associated with a second metadata, and the first and second metadata together indicating that the first data item is more recent than the second data item; and
wherein the visualization controller generates the aura-creation command by additionally utilizing the first and second metadata such that the aura displayed emphasizes the first data item over the second data item.

31. The light-based system of claim 17,
wherein the aura comprises a pattern, sequence, or color of light;
wherein the pattern, sequence, or color of light conveys a meaning comprising an extent of interest in forming light-based connections or an interest in engaging in a particular activity; and
wherein the system further comprises a user interface for associating the meaning with the pattern, sequence or color of light and for retrieving the meaning associated with the pattern, sequence or color of light.

32. The light-based system of claim 17,
wherein the user comprises a first user and a second user and the one or more user data comprises one or more first user data and one or more second user data;
wherein, in response to the receipt of a second aura-creation command, the visualization infrastructure further controls one or more visualization actuators proximate to the second user for visually displaying a second aura, the second aura-creation command comprising one or more of the following: the one or more second user data associated with a second user identifier and a location of a second user, and the second aura comprising the one or more second user data; and wherein, in response to detecting a correlation between the one or more first user data and the one or more second user data, the visualization infrastructure controls one or more visualization actuators to visually display a link between the first user and the second user.

33. The light-based system of claim 17, wherein the visualization infrastructure further controls one or more sensory actuators to display the aura, the sensory actuators comprising non-visually based actuators.

34. The light-based system of claim 33, wherein the non-visually based actuators comprise auditory actuators or olfactory actuators.

35. The light-based system of claim 17, wherein the user is tracked, the tracking comprising:

the localization system periodically determining an updated location of the user and transmitting a signal indicative of the updated location of the user, the visualization controller periodically receiving the signal indicative of the updated location of the user and generating an updated aura-creation command based additionally on the updated location of the user.

36. The light-based system of claim 1, wherein the association between the first location identifier and the at least one second location identifier is made when an extent of the correlation between the first localized light setting and the second localized light setting is at least a pre-selected adjustable amount.

37. A light-based system for forming social connections comprising:

a localization system for determining a location of a user and for transmitting a first signal indicative of the location of the user;

an identification system for determining a user identifier associated with the user, and for transmitting a second signal indicative of the user identifier;

a memory for associating the user identifier with one or more user data; and a visualization controller:
    for receiving the first signal and the second signal,
    for retrieving from the memory, the one or more user data associated with the user identifier,
    for generating an aura-creation command based at least on the one or more user data, and
    for transmitting the aura-creation command to a visualization infrastructure for controlling one or more visualization actuators for visually displaying an aura comprising at least the one or more user data.

* * * * *